J. HENRY.
Car Wheel.
No. 11,124.
Patented June 20, 1854.
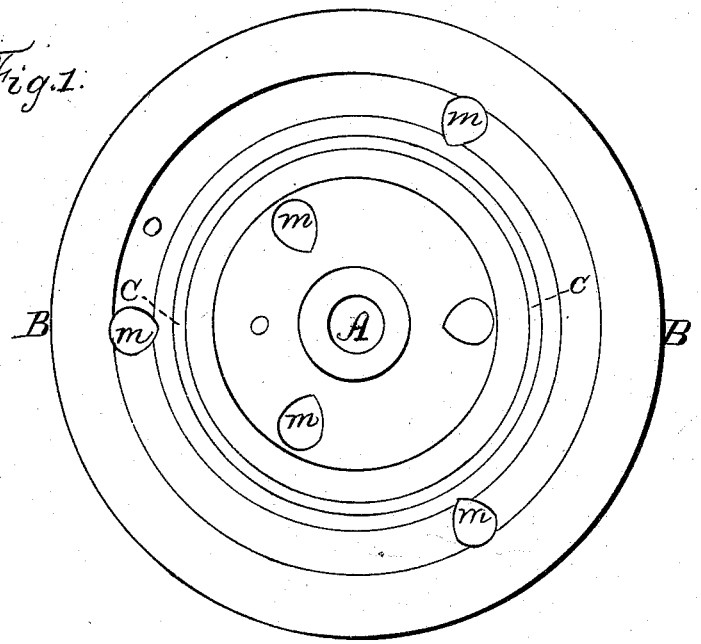
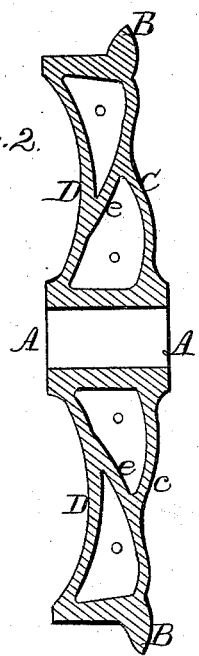

UNITED STATES PATENT OFFICE.

JOHN HENRY, OF LYNCHBURG, VIRGINIA.

CAST-IRON CAR-WHEEL.

Specification of Letters Patent No. 11,124, dated June 20, 1854.

*To all whom it may concern:*

Be it known that I, JOHN HENRY, of Lynchburg, in the county of Campbell, in the State of Virginia, have invented a new and useful Improvement in the Construction of Wheels for Railroad-Cars; and I do hereby declare that the following is a full, clear, and exact description of the construction and operation of the same, reference being had to the annexed drawings, making a part of this specification, in which—

Figure 1 is a face view of the car-wheel showing the openings marked (*m—m—m—m—m—m—*) into the hollow chambers inside of the wheel marked (O).

Fig. 2 is a transverse sectional view of the car-wheel. In this view (A—A) represent a cross section of the hub of the wheel, (D—D) and (C—C) the plates usually in use, extending from the hub to the rim, (O O O O) the cores in their places, E and E represent sections of a new plate, invented by the said JOHN HENRY, extending diagonally from the hub to the rim, uniting the two other plates. Wheels of forms now in use, are more liable to fracture in casting, and to fracture in use, than they will be, with this improvement. This third plate causes the contraction of the metal in casting, to be more regular, and uniform, and therefore it causes cracking to be less frequent then. Also when the wheels are in use, this third connecting plate, acts as a stay or brace to the other plates, and therefore makes it more difficult to crack them, and in case one of them should crack it operates to strengthen and sustain the wheel and thereby prevent accident.

I do not claim a central plate running from the hub to the rim, and not connected with the inner and outer plates; as such a wheel was patented by Frederick Warback November 6th, 1847: But What I do claim, and desire to secure by Letters Patent, is—

The intermediate continuous plate extending diagonally from the hub to the rim (in a cast iron wheel having double plates or disks) and connecting the two plates of the wheel together, substantially as above described.

JOHN HENRY.

Witnesses:
 TH. S. BOCOCK,
 SAML V. LEECH.